O. D. H. BENTLEY.
LUBRICATING DEVICE.
APPLICATION FILED MAY 21, 1910.
1,084,922.
Patented Jan. 20, 1914.
2 SHEETS—SHEET 1.
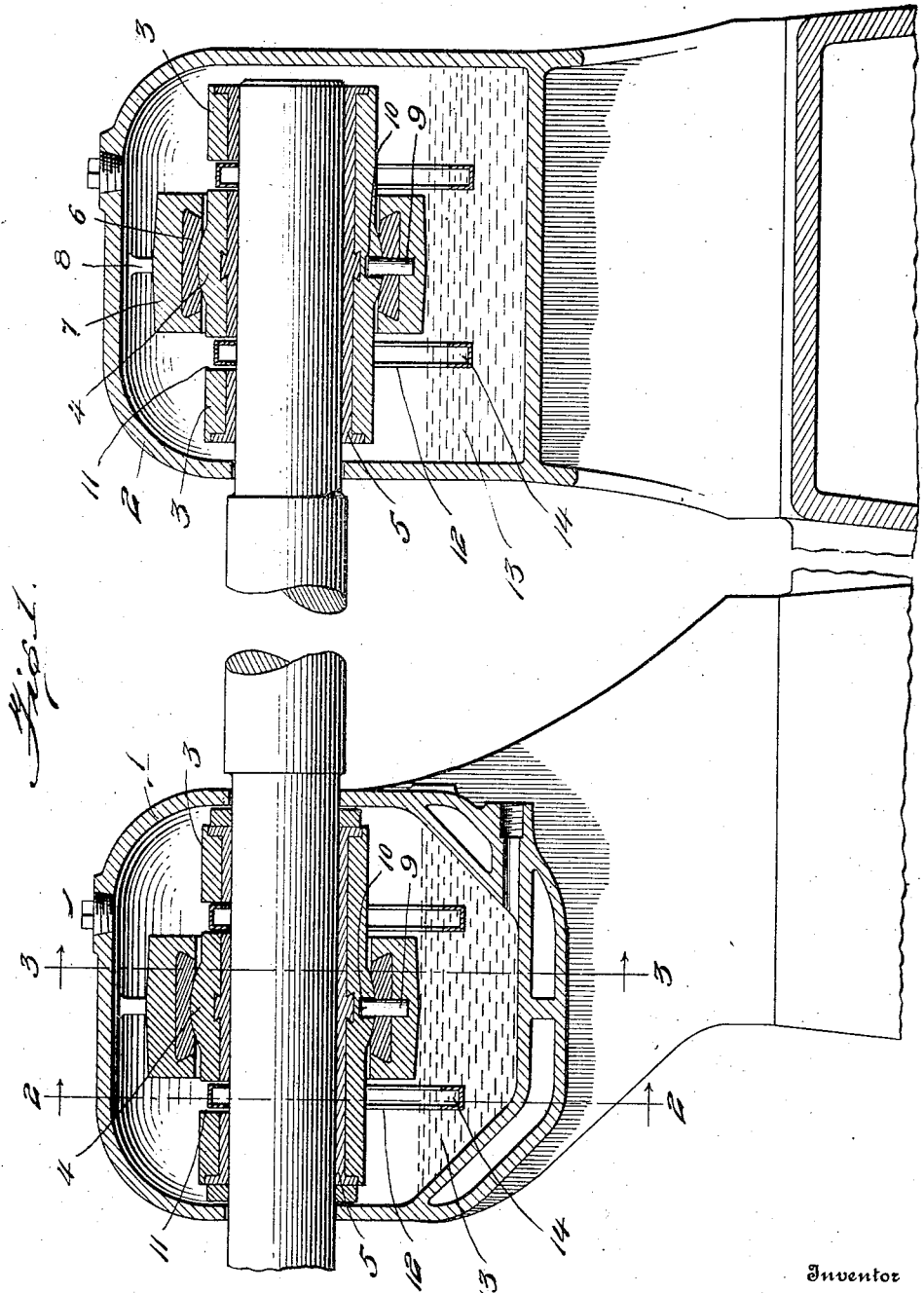
Witnesses
Inventor
Oliver D. H. Bentley
By
Attorney O. D. H. BENTLEY.
LUBRICATING DEVICE.
APPLICATION FILED MAY 21, 1910.
1,084,922.
Patented Jan. 20, 1914.
2 SHEETS—SHEET 2.
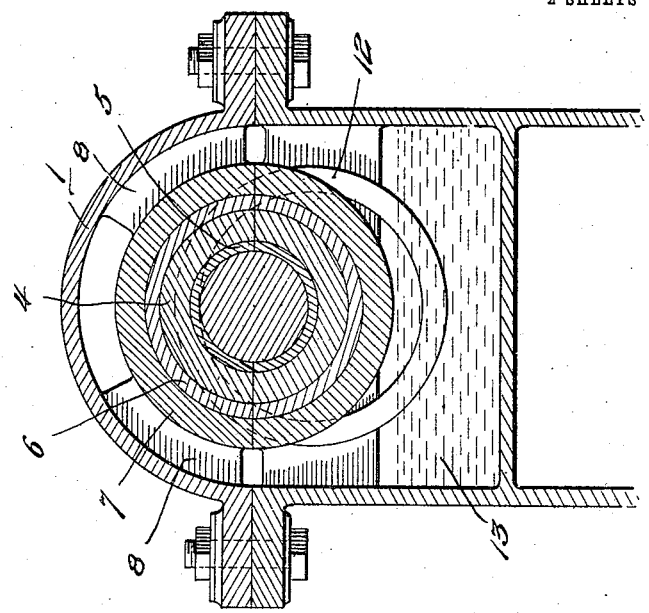
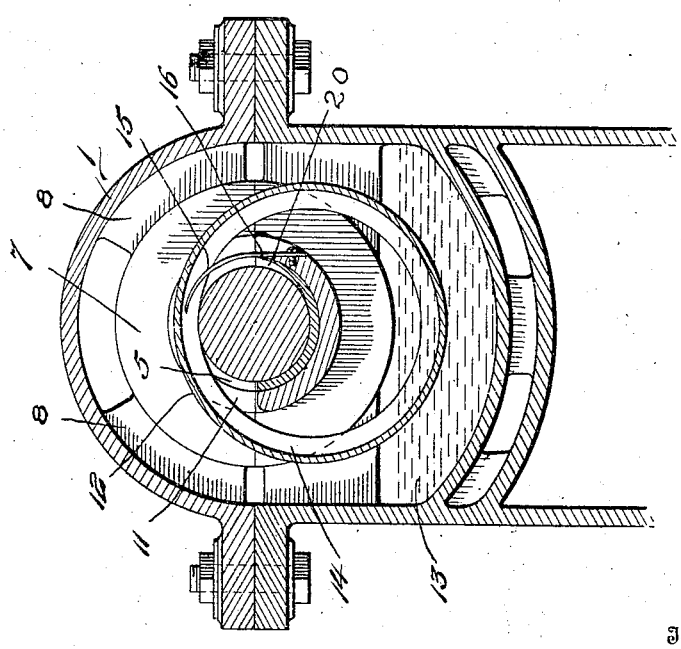
Witnesses
Inventor
Oliver D. H. Bentley
By
Attorney

UNITED STATES PATENT OFFICE.

OLIVER D. H. BENTLEY, OF BROOKLYN, NEW YORK, ASSIGNOR TO B. F. STURTEVANT COMPANY, OF BOSTON, MASSACHUSETTS, A CORPORATION OF MASSACHUSETTS.

LUBRICATING DEVICE.

1,084,922. Specification of Letters Patent. Patented Jan. 20, 1914.

Application filed May 21, 1910. Serial No. 562,653.

*To all whom it may concern:*

Be it known that I, OLIVER D. H. BENTLEY, a citizen of the United States, residing at Brooklyn, in the county of Kings and State of New York, have invented certain new and useful Improvements in Lubricating Devices, of which the following is a specification.

The present invention relates to lubricating devices for bearings.

The object of the present invention is to produce an improved lubricating device for a shaft bearing so as to secure efficient lubrication for the bearing by means of a device which is simple in construction and easy to manufacture. The lubrication of the bearing is effected by means of a rapidly flowing stream of oil delivered to the bearing. In the preferred embodiment of the invention, the stream of oil is given a high velocity by means of a carrier from which the oil is deflected and led along a smooth inwardly directed, curved path to the bearing where it is delivered to the surfaces to be lubricated. The carrier is preferably an oil ring having a channeled inner periphery in which oil taken from an oil reservoir below the shaft is given a high velocity, from which the oil is scooped and is delivered between the shaft and bearing in a direction substantially tangential to the shaft.

In the accompanying drawings, forming a part of this application and in which similar reference numerals indicate corresponding parts in the several views: Figure 1 is an axial section, illustrating one embodiment of my invention applied to both the way and end bearings of a shaft; Fig. 2 is a section on the line 2—2 of Fig. 1, and Fig. 3 is a section on the line 3—3 of Fig. 1.

Referring to the drawings, the way and end bearings are shown provided with dust-proof casings 1 and 2, respectively; similar reference numerals being applied to the corresponding elements in the two casings.

The journal bearing is shown comprising any usual box 3 provided with a bushing 5, and having a zone-shaped annulus 4; a facing member 6 is secured to supports 7 on casing webs 8, and provided with a recess for seating the annulus 4 to rockingly support the bearing. A pin 9 extends from the support 7 through the member 6, and engages a somewhat enlarged recess 10 in the annulus 4; thereby locking the journal bearing against rotation, while permitting free rocking thereof to accommodate slight shifting of the shaft axis and compensate for irregular wear.

Slots 11 are provided through the upper portion of the journal bearing for receiving oiling rings 12; said rings being provided with channeled inner peripheries 14 supported freely on the shaft, and depending eccentrically therefrom into an oil reservoir 13 in the casing.

Deflectors 15 extend from the bearing substantially tangentially to the walls 16 of recesses or cavities 20 formed between the bearing and shaft; said deflectors being curved to project into the ring channels 14 in a direction rearwardly to the rotation of the shaft.

As illustrated in Fig. 2, the free ends of the deflectors 15 extend toward, but do not touch the bottoms of the ring channels 14, so that, while the deflectors deflect practically the entire body of oil carried in the ring channels, they do not frictionally engage the bottoms of the ring channels and prevent the rings 12 from freely rotating. The recesses or cavities 20 between the bearing and the shaft are formed by peripheral grooves cut in the inside of the bushings 5 below the slots 11. The mouths of these recesses open upwardly behind the deflectors 15 and the closed lower ends of the recesses merge with the bearing surfaces of the bushings 5.

As shown especially in Fig. 2, the curved deflectors 15 coöperate with the ring channels 14 and walls 16 to provide a continuous and approximately spiral path, along which a stream of oil is conducted at high velocity from the reservoir 13, and such rapidly-flowing stream deflected in its integrity tangentially between the shaft and bearing; thereby providing an improved construction in which the oil is positively deflected to cause its efficient impingement between the shaft and bearing in an integral unbroken stream of high velocity, thereby insuring a highly advantageous condition of oil supply and pressure under all practical operations.

When the rapidly flowing stream of oil scooped from the ring channel 14 by the deflector 15 enters the tapering recess or cavity 20 and impinges between the shaft and bearing, its velocity is checked and the momentum or *vis viva* of the oil forces it with a positive pressure into the bearing. The volume of the oil stream deflected from the channel 14 is such that it floods the recess or cavity 20, and therefore when it impinges into the confined recess or cavity 20, its velocity is suddenly checked and the shock due to the decrease in its momentum or *vis viva* creates and maintains a static pressure in the recess or cavity 20 which forces the oil into the bearing.

The amount of oil deflected from the channel 14 of the oil ring 12 and impinging into the open mouth of the recess or cavity 20 is greater than the amount of oil which can flow from the recess or cavity 20 between the bearing surfaces. The excess of oil which does not enter the bearing escapes on either side of the deflector 15 and drips into the reservoir 13. This excess oil, however, does useful work because when its velocity is changed by impingement into the open mouth of the confined recess or cavity 20 the pressure caused by its change in velocity assists in forcing into the bearing the oil which enters between the bearing surfaces and furnishes the oil film for lubrication. The ring 12, the deflector 15 and the recess 20 act like an oil pump to force a copious supply of oil between the shaft and the bushing 5 to the very bottom of the bearing and therefore provide a forced feed lubrication for the bearing. The present invention does away with the oil pump and piping connections hitherto incident to systems of forced-lubrication, and obtains the advantage of forced-lubrication for the bearing with an exceedingly simple arrangement of parts. In this connection it is to be noted that the tapering recess 20 extends from the deflector 15 around the periphery of the shaft in the direction of rotation of the shaft. Consequently, the rapidly rotating shaft exerts a frictional drag upon the moving oil stream in the recess 20 and assists the flow of oil into the bearing.

In the operation of my invention, the freely-supported oiling rings 12 will be rotated merely by the frictional engagement of their channeled inner peripheries with the rotating shaft. This action of the oiling rings coöperates with the spiral path provided for the oil stream and the deflectors, to insure an efficiently uniform and even operation under all practical conditions.

I have illustrated and described preferred and satisfactory constructions, but changes could be made within the spirit and scope of my invention.

Having thus described my invention, what I claim as new and desire to secure by Letters Patent is:

1. In a forced-lubricating shaft bearing, the combination of a journal bearing provided with an inner groove extending tangentially to the shaft, an oil reservoir, a ring loosely supported on the shaft and provided with a channeled inner periphery extending within said reservoir, and a curved deflector extending substantially tangentially to the walls of such bearing groove and ring channel and coöperating with such walls to provide a continuous substantially spiral path for the oil from said reservoir to the shaft.

2. In a forced-lubricating shaft bearing, the combination of a journal bearing provided with an inner groove extending tangentially to the shaft, an oil reservoir, a ring loosely mounted on the shaft and provided with a channeled inner periphery extending within said reservoir, and a curved blade secured to said journal bearing extending into the ring channel in a direction opposite to the direction of rotation of the shaft and terminating within such ring channel at a space from the periphery of the latter, said blade extending substantially tangentially to the walls of such bearing groove and ring channel to coöperate with such walls for providing a continuous substantially spiral path for the oil from said reservoir to the shaft.

3. A shaft bearing having, in combination, an oil reservoir, a carrier for taking a stream of oil from the oil reservoir and imparting a high velocity to the stream, and means for utilizing the momentum of the oil stream to force the oil into the bearing comprising provision for engaging and deflecting the rapidly flowing stream of oil from the carrier between the shaft and bearing, substantially as described.

4. A shaft bearing having, in combination, a bearing member having a bearing surface for the shaft, an oil reservoir, a ring loosely mounted on the shaft to depend into the oil reservoir and provided with a channel in its inner periphery, and a deflector comprising a projecting plate on the bearing extending into the ring channel in a direction opposite to the direction of rotation of the shaft and having its free end extending toward but out of contact with the bottom of the channel, substantially as described.

5. A shaft bearing having, in combination, a bearing member having a peripheral groove forming an open-mouthed recess extending between the bearing and shaft, an oil reservoir, an oil ring provided with a channel in its inner periphery loosely supported on the shaft and depending into the reservoir for taking oil from the reservoir imparting a high velocity thereto, and a deflector mounted on the bearing and extending into the ring channel for deflecting the oil from the ring channel into the mouth of the recess along a path substantially tangential to its former path, substantially as described.

6. A shaft bearing having, in combination, a bearing member having a portion of its top cut away and having a groove extending from one edge of the cut away portion toward the bottom of the bearing to form an oil-duct or recess between the shaft and the bearing, an oil reservoir, a ring having a channel in its inner periphery loosely supported on the top of the shaft to be frictionally driven thereby and depending into the oil reservoir, and a curved deflector mounted on the bearing at the mouth of the groove forming a substantially tangential continuation of the mouth of the groove and having its free end extending into the ring channel substantially tangential to the ring, whereby when the shaft is rotated oil is collected in the channel of the ring and is led in a rapidly flowing stream along the deflector into the groove in a smooth inwardly directed curved path, substantially as described.

7. A device for lubricating a bearing having, in combination, an oil reservoir, means for taking a stream of oil from the oil reservoir and imparting to it a high velocity, means for leading the high velocity stream of oil along a smooth inwardly-directed curved path to the bearing and for delivering it at a high velocity to the bearing, and means at the bearing for receiving the high velocity stream of oil and for transforming its momentum or *vis viva* into a pressure at the bearing for forcing the oil between the surfaces to be lubricated so that forced-lubrication is provided for the bearing, substantially as described.

In testimony whereof I affix my signature in presence of two witnesses.

OLIVER D. H. BENTLEY.

Witnesses:
THOMAS J. O'CONNOR,
EDWIN C. KNAPP.